United States Patent
Chin et al.

(10) Patent No.: US 9,651,810 B2
(45) Date of Patent: May 16, 2017

(54) DISPLAY PANEL AND METHOD OF MANUFACTURING A DISPLAY SUBSTRATE FOR USE IN THE DISPLAY PANEL

(75) Inventors: HongKee Chin, Suwon-si (KR); Yunjong Yeo, Seoul (KR); Yui-Ku Lee, Seoul (KR); Yu-Gwang Jeong, Jeollanam-do (KR); Jin-Young Choi, Incheon (KR); Sanggab Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 328 days.

(21) Appl. No.: 13/571,090

(22) Filed: Aug. 9, 2012

(65) Prior Publication Data

US 2013/0141678 A1 Jun. 6, 2013

(30) Foreign Application Priority Data

Dec. 1, 2011 (KR) ........................ 10-2011-0127927

(51) Int. Cl.
*G02F 1/1335* (2006.01)
*G02F 1/1333* (2006.01)

(52) U.S. Cl.
CPC ............... *G02F 1/133345* (2013.01); *G02F 2001/133519* (2013.01); *G02F 2202/022* (2013.01)

(58) Field of Classification Search
CPC ......... G02F 1/133514; G02F 1/133512; G02F 2001/133519; G02F 1/133345; G02F 2202/022
USPC ......................................... 349/106, 101, 110
See application file for complete search history.

(56) References Cited

U.S. PATENT DOCUMENTS

| | | | | |
|---|---|---|---|---|
| 6,162,654 A * | 12/2000 | Kawabe | ............ | G02F 1/133512 349/106 |
| 7,414,354 B2 | 8/2008 | Kishimoto et al. | | |
| 2004/0266041 A1* | 12/2004 | Kim | .................... | G02F 1/13458 438/30 |
| 2007/0109474 A1* | 5/2007 | Yang | ................. | G02F 1/133514 349/114 |
| 2007/0291385 A1* | 12/2007 | Kim | ....................... | G02B 5/201 359/885 |
| 2011/0032461 A1* | 2/2011 | Cho | ........................ | C22C 28/00 349/116 |
| 2011/0269254 A1* | 11/2011 | Ryu | .................. | G02F 1/133514 438/29 |

FOREIGN PATENT DOCUMENTS

| | | |
|---|---|---|
| JP | 2000-214318 | 8/2000 |
| JP | 2000-222944 | 8/2000 |
| JP | 2011-017878 | 1/2011 |

* cited by examiner

*Primary Examiner* — Paisley L Arendt
*Assistant Examiner* — Agnes Dobrowolski
(74) *Attorney, Agent, or Firm* — Innovation Counsel LLP

(57) ABSTRACT

A display panel includes a first substrate and a second substrate facing the first substrate. The first and substrate includes a plurality of pixel areas and a non-pixel area disposed adjacent to the pixel areas. The display panel further includes a plurality of signal lines disposed on the second substrate. The display panel further includes a color filter disposed on the first substrate or the second substrate. The display panel further includes an inorganic layer disposed on the color filter layer, an organic layer disposed on the inorganic layer, and a conductive layer disposed on the organic layer.

8 Claims, 20 Drawing Sheets

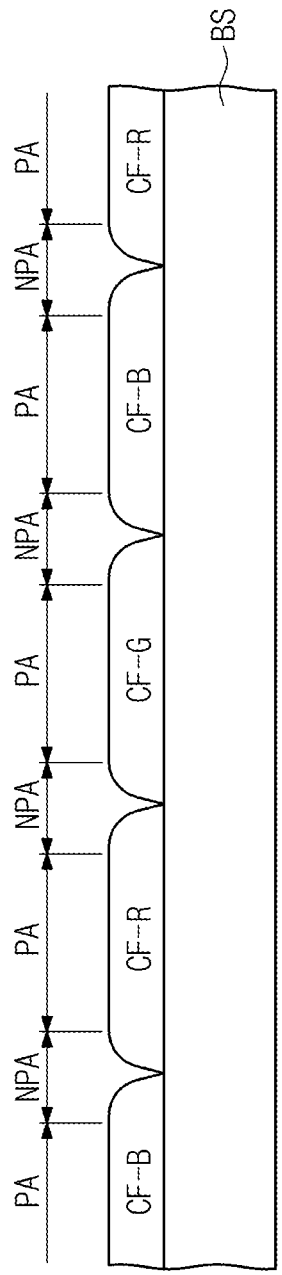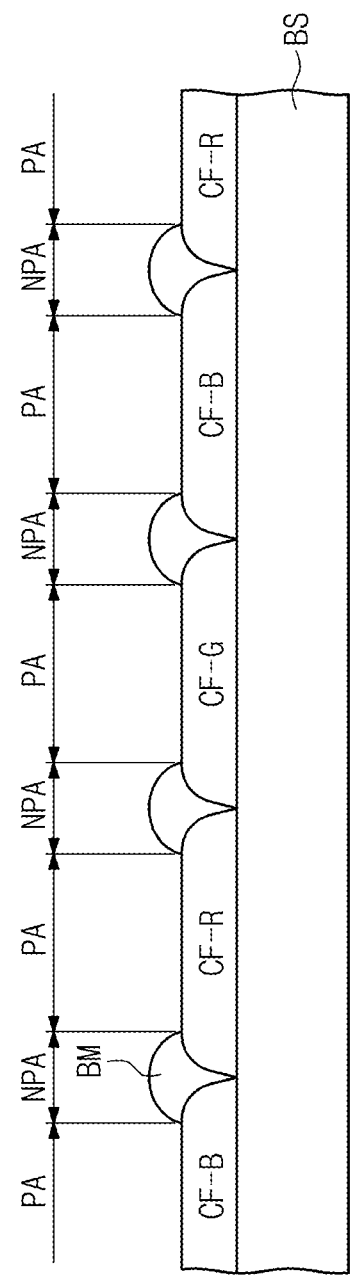

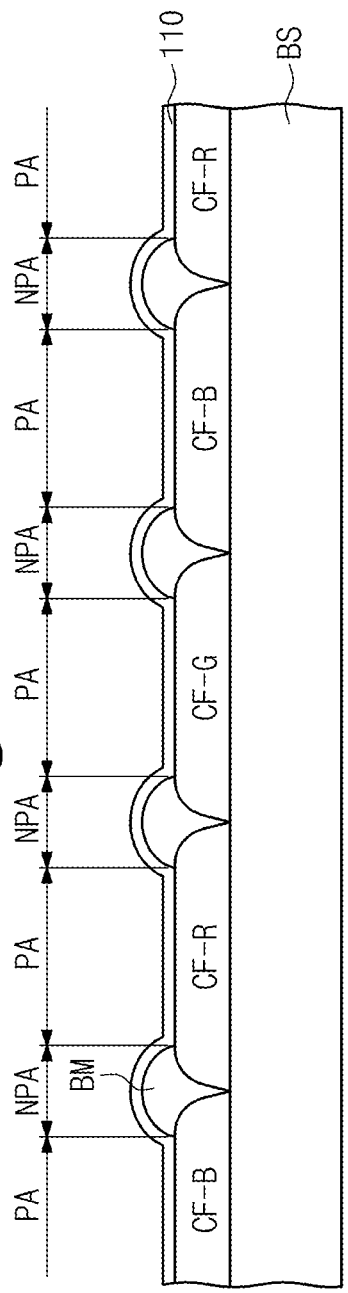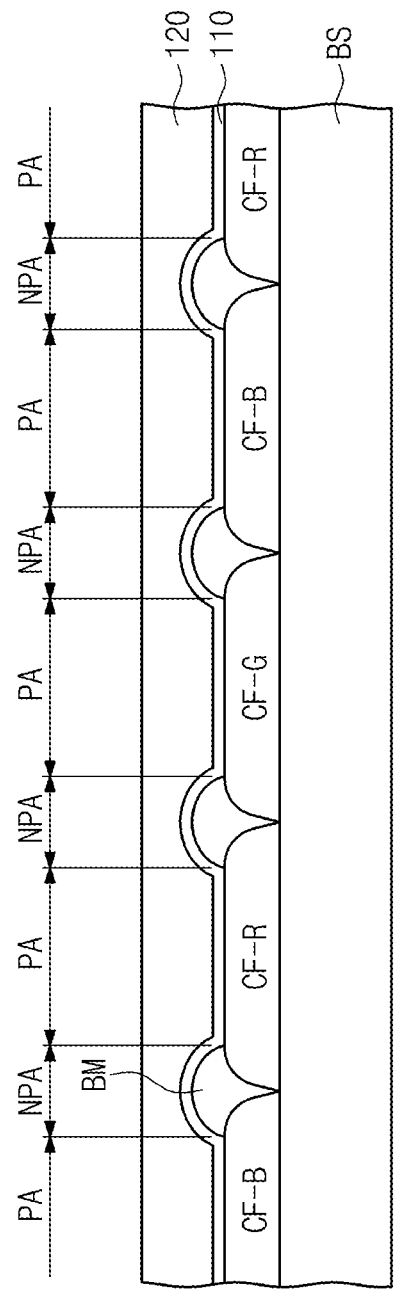

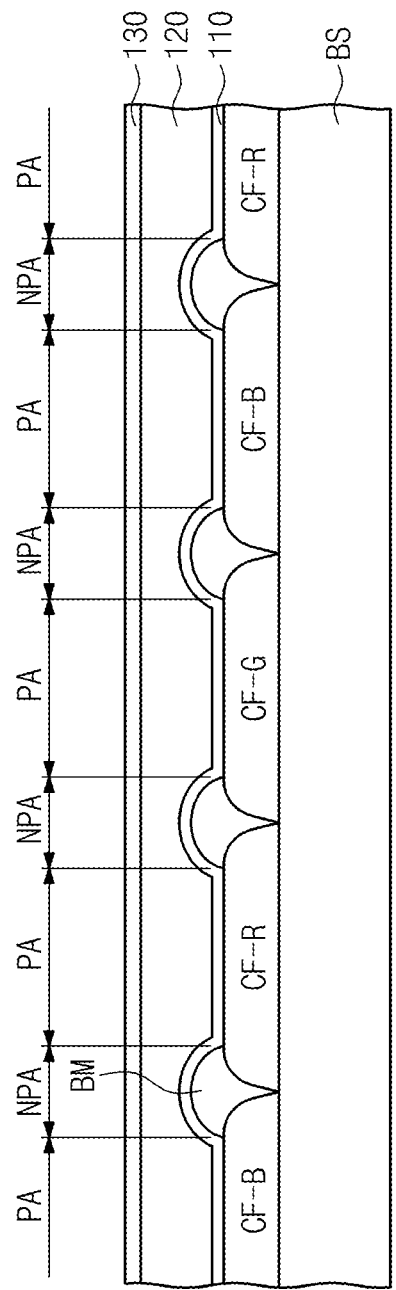

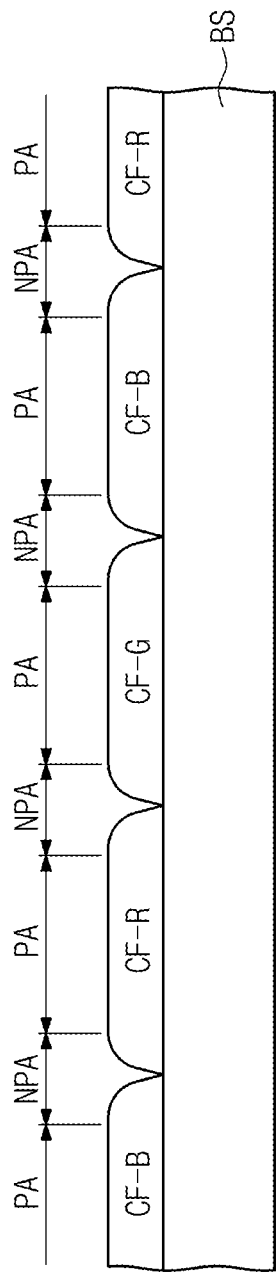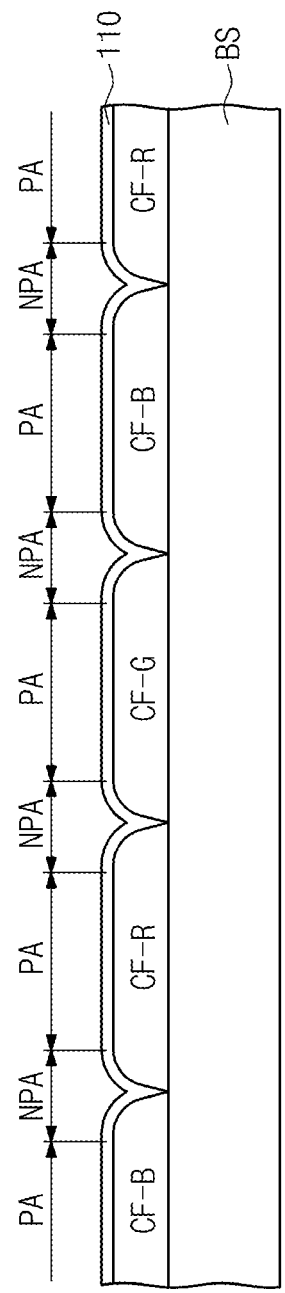

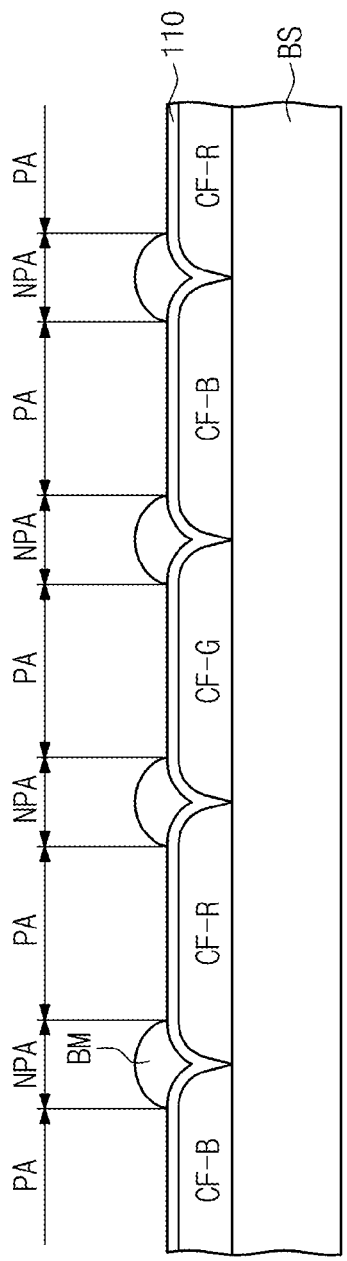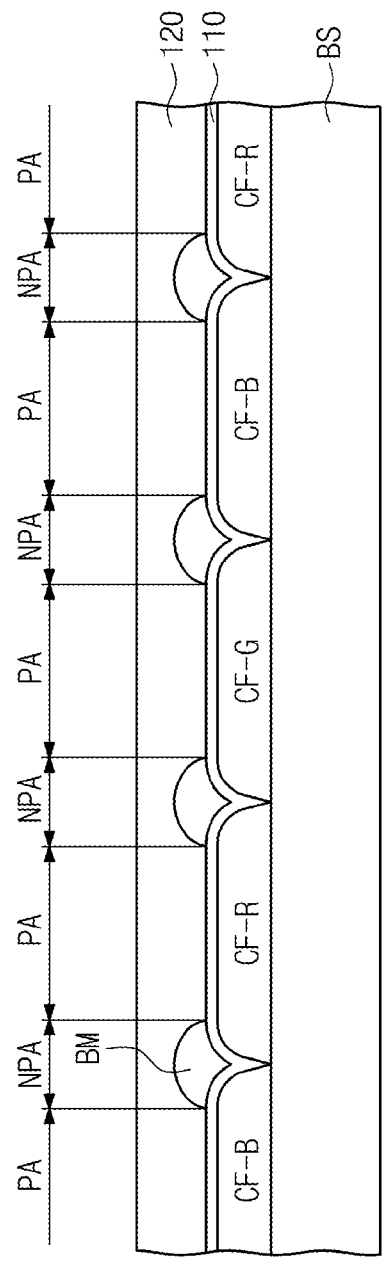

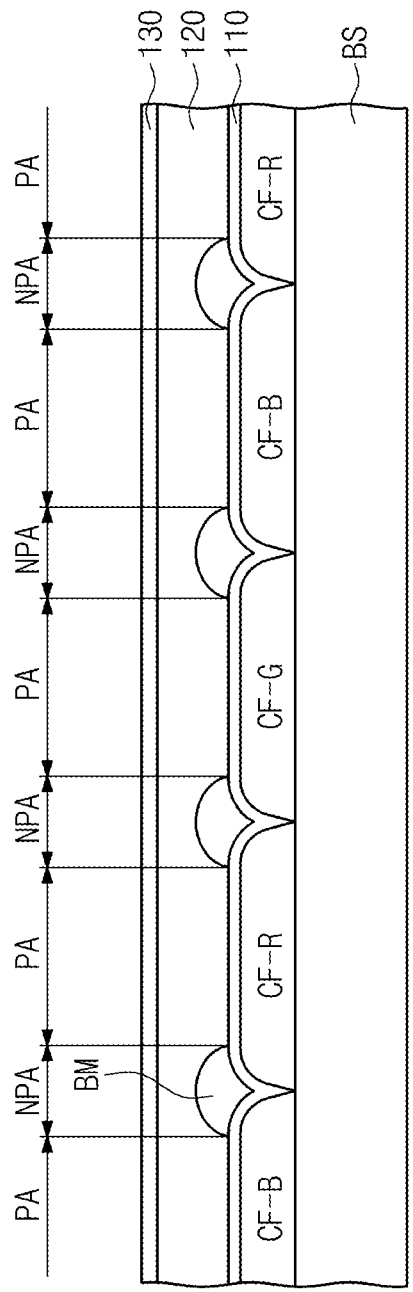

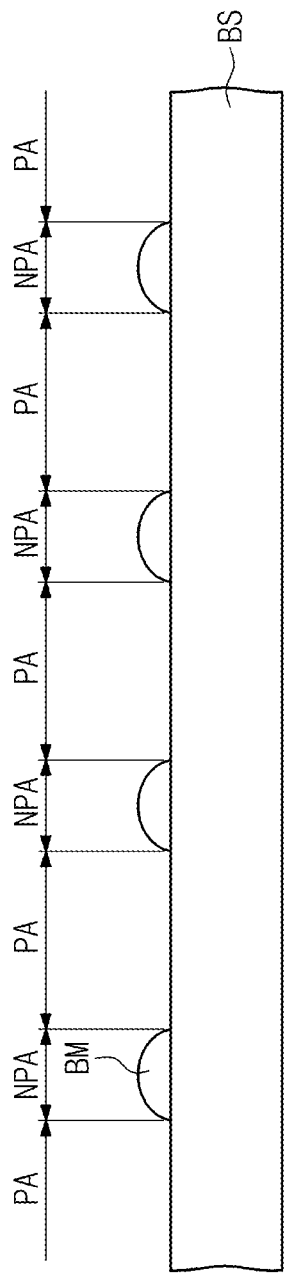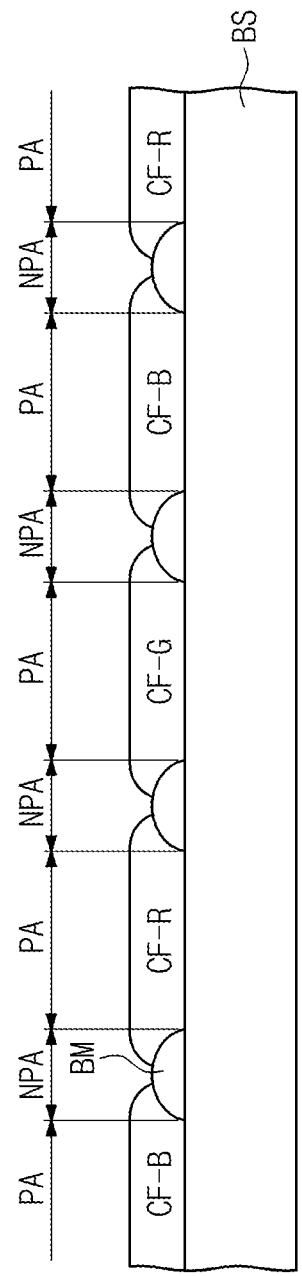

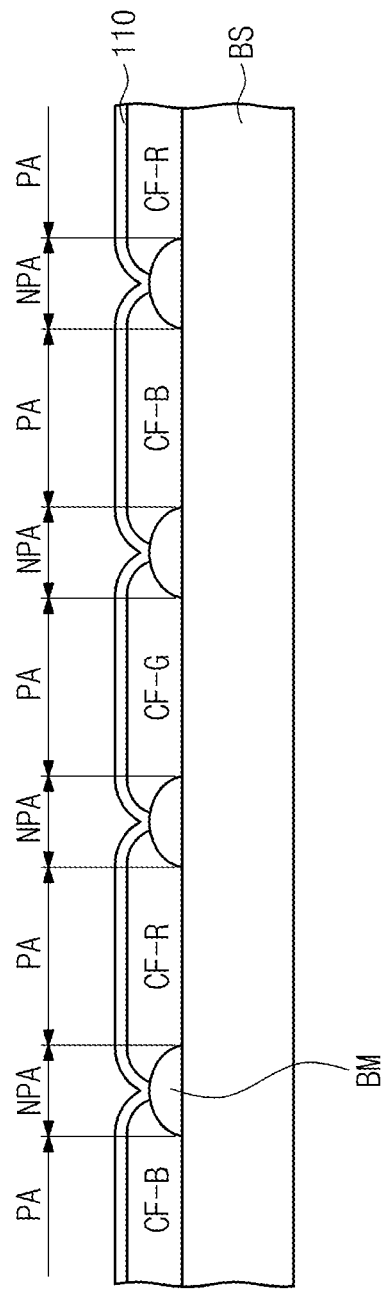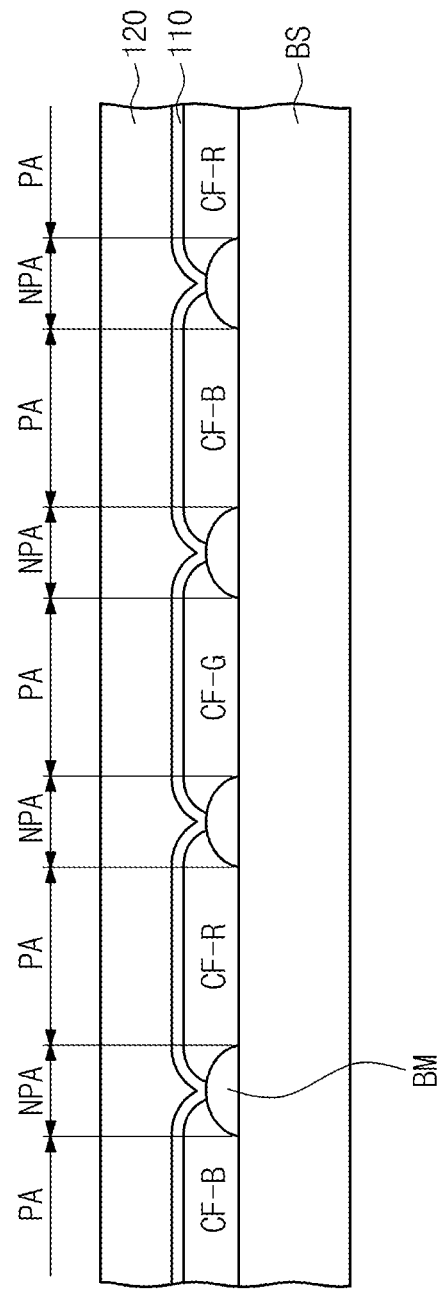

DISPLAY PANEL AND METHOD OF MANUFACTURING A DISPLAY SUBSTRATE FOR USE IN THE DISPLAY PANEL

CROSS-REFERENCE TO RELATED APPLICATION

This application claims priority to and benefit of Korean Patent Application No. 10-2011-0127927 filed in the Korean Intellectual Property Office on Dec. 1, 2011, the contents of which are incorporated herein by reference.

BACKGROUND

1. Field of the Invention

The present invention relates to a display panel and a method of manufacturing a display substrate for use in the display panel. More particularly, the present invention relates to a display panel with desirable reliability and a method of manufacturing a display substrate for use in the display panel.

2. Description of Related Art

In general, a display apparatus includes a display panel for displaying images. The display panel may display an image using a light provided from an external light source. The display panel may include color filters for filtering colors of the light.

The display panel includes a plurality of pixel areas through which lights having filtered colors pass and a non-pixel area disposed adjacent to the pixel areas. The display panel includes two substrates; the pixel areas and the non-pixel area are defined on each of the two substrates. Typically, the two substrates face each other, and the color filters are disposed on one of the two substrates.

The display panel may include a switching device and a pixel electrode in each pixel area. The display panel may include a common electrode facing the pixel electrode. The pixel electrode or the common electrode may be disposed on associated color filters. An organic layer may be disposed between the pixel electrode and the color filters or between the common electrode and the color filters.

SUMMARY

Some embodiments of the present invention are related to display panels with substantially reliable pixel electrodes and/or substantially reliable common electrodes.

Some embodiments of the present invention are related to methods of manufacturing display substrates for use in display panels.

An embodiment of the invention is related to a display panel that includes a first substrate and a second substrate facing the first substrate. At least one of the first and second substrates includes a plurality of pixel areas and a non-pixel area disposed adjacent to the pixel areas. The display panel includes a plurality of signal lines disposed on the second substrate. The display panel further includes a color filter disposed on the first substrate or the second substrate. The display panel further includes an inorganic layer disposed on the color filter layer, an organic layer disposed on the inorganic layer, and a conductive layer disposed on the organic layer.

The display panel further includes a black matrix disposed in or overlapping the non-pixel area. The color filter is disposed in or overlaps at least one of the pixel areas.

The display panel further includes a plurality of scan lines disposed on the first substrate. The display panel further includes a plurality of read out lines disposed on the first substrate, insulated from the scan lines, and crossing the scan lines. The display panel further includes a plurality of light sensors, each of which being connected to a corresponding scan line of the scan lines and a corresponding read out line of the read out lines. The display panel further includes an insulating layer disposed to cover the light sensors. In one or more embodiments, the color filter is disposed on a surface of the insulating layer and contacts the insulating layer.

The signal lines include a plurality of gate lines and a plurality of data lines.

The display panel further includes a plurality of pixel electrodes disposed in the conductive layer and respectively corresponding to the pixel areas. The display panel further includes a plurality of switching devices respectively corresponding to the pixel areas. Each of the switching devices applies the data voltage to a corresponding pixel electrode of the pixel electrodes in response to the gate voltage.

The display panel further includes a liquid crystal layer interposed between the first substrate and the second substrate.

An embodiment of the invention is related to a method of manufacturing a display substrate for use in a display panel. The method includes forming a base substrate that includes a plurality of pixel areas and a non-pixel area disposed adjacent to the pixel areas. The method further includes forming a color filter layer corresponding to each of the pixel areas. The method further includes forming an inorganic layer on the color filter, forming an organic layer on the inorganic layer, and forming a conductive layer on the organic layer.

In one or more embodiments of the invention, an inorganic layer is disposed on a color filter, an organic layer is disposed on the inorganic layer, and a conductive layer is disposed on the organic layer. The inorganic layer may separate the color filter from the organic layer, thereby preventing the color filter from potential swelling. Advantageously, sufficient bonding strength between the organic layer and the conductive layer may be ensured.

BRIEF DESCRIPTION OF THE DRAWINGS

Advantages of the present invention will become readily apparent by reference to the following detailed description when considered in conjunction with the accompanying drawings wherein:

FIGS. 12A to 12E are views illustrating a method of manufacturing a display substrate according to an embodiment of the present invention;

FIGS. 13A to 13E are views illustrating a method of manufacturing a display substrate according to an embodiment of the present invention; and FIGS. 14A to 14E are views illustrating a method of manufacturing a display substrate according to an embodiment of the present invention.

DETAILED DESCRIPTION

Figure 1:
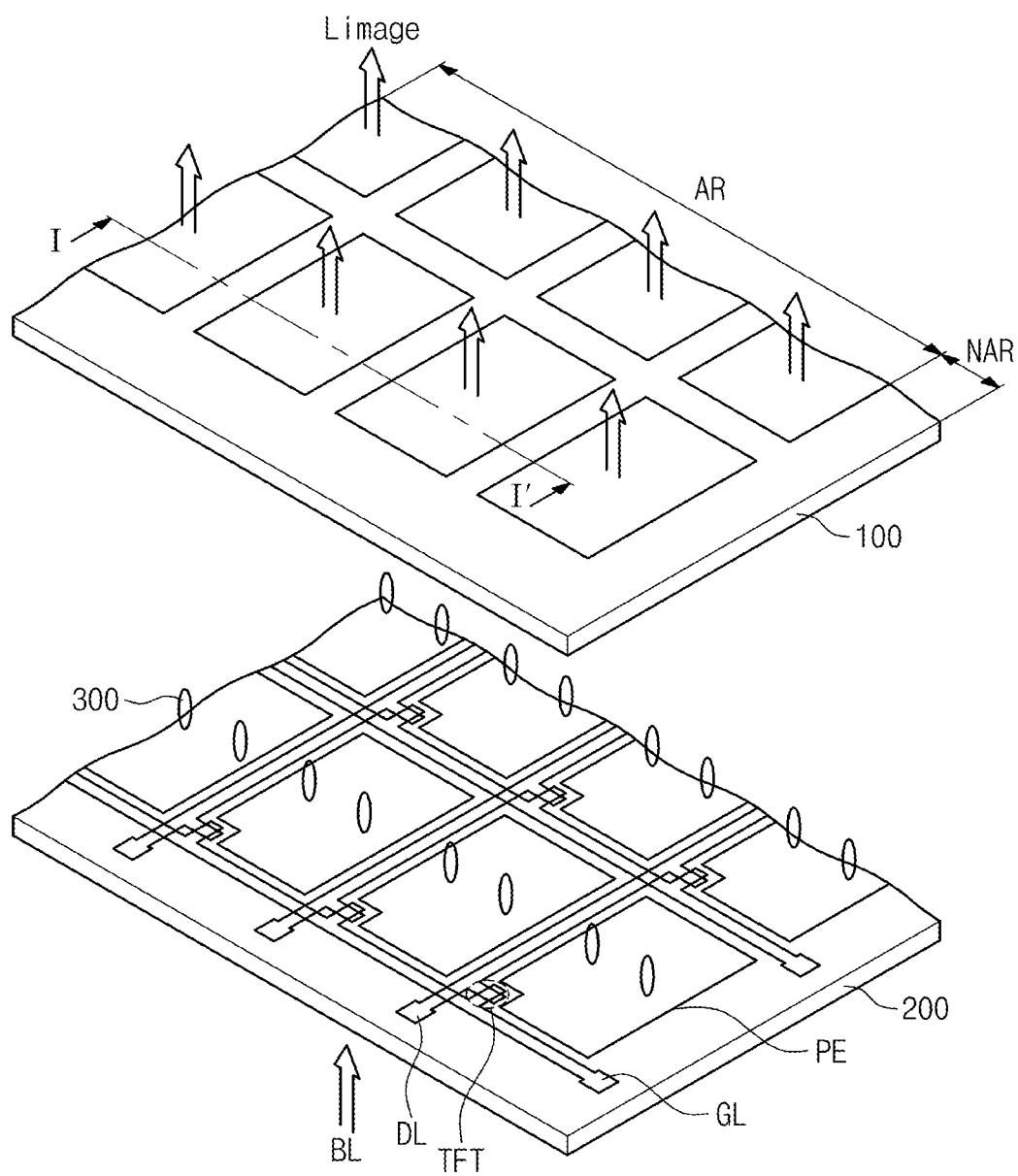
FIG. 1 is a perspective view illustrating a portion of a display panel according to an embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers may refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
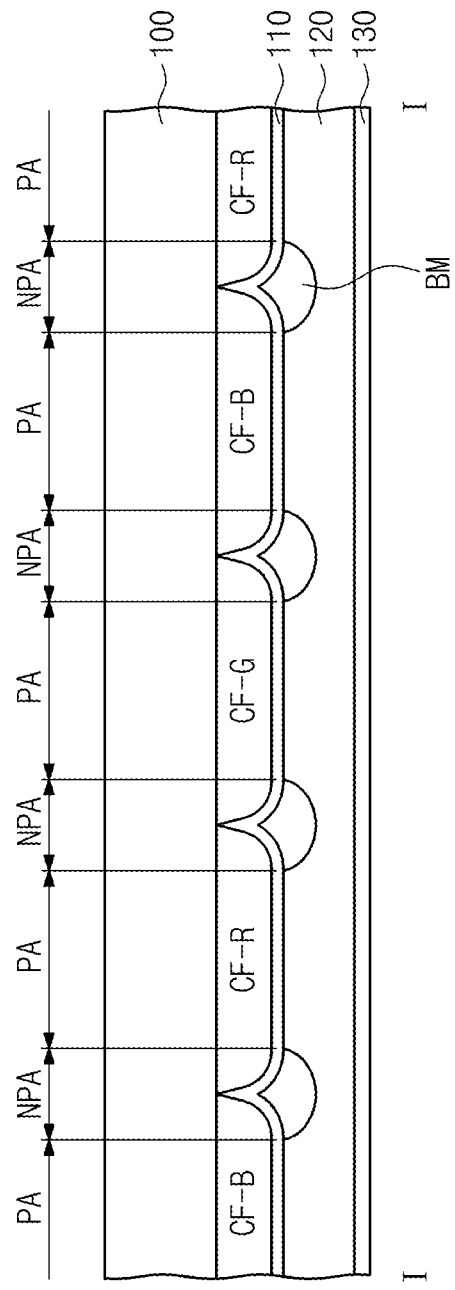
FIG. 2 is a cross-sectional view illustrating a structure of a first display substrate shown in FIG. 1.

FIG. 1 is a perspective view illustrating a portion of a display panel according to an embodiment of the present invention. FIG. 2 is a cross-sectional view illustrating a structure of a first display substrate illustrated in FIG. 1.

Referring to FIGS. 1 and 2, the display panel includes an active area AR and a non-active area NAR. The active area AR displays an image Limage and the non-active area NAR does not display the image Limage.

The active area AR includes a plurality of pixel areas PA and a non-pixel area NPA disposed adjacent to the pixel areas PA (and disposed between adjacent pixel areas). Each pixel area PA transmits a light having a specific color. The image Limage is represented by lights having specific colors transmitted from the pixel areas PA. The non-pixel area NPA corresponds to a boundary between the pixel areas PA, and a plurality of signal lines included in the display panel is arranged in the non-pixel area NPA. The non-active area NAR includes pads electrically connected to ends of the signal lines.

The display panel includes a first display substrate and a second display substrate. The first display substrate includes a first substrate 100; the second display substrate includes a second substrate 200 facing the first substrate 100. Each of the first and second display substrates and the associated first and second substrates 100 and 200 includes pixel areas PA and a non-pixel area NPA. The first and second substrates 100 and 200 may include one or more of a glass substrate, a silicon substrate, a film substrate, etc.

A plurality of gate lines GL is disposed on the second substrate 200 and extends in a first direction; a plurality of data lines DL is disposed on the second substrate 200 and extends in a second direction crossing the first direction. Each of the gate lines GL receives a gate signal; each of the data lines DL receives a data voltage.

Pixel electrodes PE are disposed on the second substrate 200 and respectively arranged in the pixel areas PA. Each pixel electrode PE is electrically connected to a corresponding one of the gate lines GL and a corresponding one of the data lines DL by a switching device TFT. The switching device TFT may be a thin film transistor, and the thin film transistor is turned on in response to the gate voltage to apply the data voltage to the pixel electrode PE.

Color filters CF-R, CF-G, and CF-B are disposed on the first substrate 100 and/or the second substrate 200. The color filters CF-R, CF-G, and CF-B are disposed in the pixel areas PA, respectively. The color filters CF-R, CF-G, and CF-B include a red color filter CF-R, a green color filter CF-G, and a blue color filter CF-B.

The display panel may represent one or more of a liquid crystal display panel, an organic light emitting display panel, an electrophoretic display panel, an electro-wetting display panel, etc.

As an example, the display panel may be a liquid crystal display panel that includes a liquid crystal layer 300 disposed between the first substrate 100 and the second substrate 200 as illustrated in FIG. 1. The liquid crystal display panel receives the light BL provided from a backlight unit (not illustrated) and controls the light BL (in the pixel areas PA) to display a image.

As illustrated in FIG. 2, the color filters CF-R, CF-G, and CF-B may be disposed on the first substrate 100, which is the base substrate of the first display substrate. In addition, an inorganic layer 110 is disposed on the color filters CF-R, CF-G, and CF-B. The inorganic layer 110 contacts the color filters CF-R, CF-G, and CF-B. At least a portion of the inorganic layer 110 is disposed between two adjacent color filters. The inorganic layer 110 includes an inorganic material, such as silicon nitride (SiNx), but it should not be limited thereto or thereby.

An organic layer 120 is disposed on the inorganic layer 110 such that the inorganic layer 110 is disposed between the organic layer 120 and the color filters CF-R, CF-G, and CF-B. The organic layer 120 planarizes surface irregularities caused by the color filters CF-R, CF-G, and CF-B and includes a substantially even surface.

A conductive layer 130 is disposed on the substantially even surface of the organic layer 120 such that the organic layer 120 is disposed between the conductive layer 130 and the color filters CF-R, CF-G, and CF-B. The conductive layer 130 includes a transparent conductive material, such as indium tin oxide (ITO), zinc oxide (ZnO), etc. As illustrated in FIG. 2, the conductive layer 130 disposed on the first substrate 100 may serve as a common electrode for the display panel, and the common electrode may be applied with a ground voltage.

The inorganic layer 110 prevents the color filters CF-R, CF-G, and CF-B from being deformed when the organic layer 120 is formed. In one or more embodiments, the inorganic layer 110 prevents a swelling phenomenon associated with the color filters CF-R, CF-G, and CF-B.

In general, the organic layer 120 is formed by coating an organic material on the color filters CF-R, CF-G, and CF-B and curing the coated organic material. Without the inorganic layer 110 being disposed between the organic material and the color filters CF-R, CF-G, and CF-B, before the organic material is cured, the solvent in the organic material may infiltrate into the color filters CF-R, CF-G, and CF-B, and thus the color filters CF-R, CF-G, and CF-B may be swelled by the solvent.

Afterward, the color filters CF-R, CF-G, and CF-B are cured, and the solvent infiltrated into the color filters CF-R, CF-G, and CF-B is vaporized. Consequently, the volume of each of the color filters CF-R, CF-G, and CF-B is reduced. This is called the swelling phenomenon.

The swelling phenomenon associated with the color filters CF-R, CF-G, and CF-B typically causes deformation of the organic layer 120, and a bonding strength between the organic layer 120 and the conductive layer 130 is reduced. When the bonding strength between the organic layer 120 and the conductive layer 130 is reduced to a certain level, the conductive layer 130 is separated from the organic layer 120. As a result, when patterning the conductive layer 130, an etchant may infiltrate into the separation between the organic layer 120 and the conductive layer 130, thereby causing an undesirable undercut of the conductive layer 130.

The inorganic layer 110 blocks the solvent from infiltrating into the color filters CF-R, CF-G, and CF-B. Thus, the swelling phenomenon may be prevented, and the bonding strength between the conductive layer 130 and the organic layer 120 may be maintained. In addition, the undercut generated when the conductive layer 130 is patterned may be prevented. In one or more embodiments, the inorganic layer 110 has a thickness of about 50 angstroms or more to perform the above-mentioned functions.

As illustrated in FIG. 2, the color filters CF-R, CF-G, and CF-B are disposed on a surface of the first substrate 100. Color filters disposed in two consecutive pixel areas PA have different colors. The red color filter CF-R, the green color filter CF-G, and the blue color filter CF-B are disposed in three successive pixel areas PA, respectively.

The non-pixel area NPA includes a black matrix BM. The black matrix BM is disposed between the pixel areas PA to prevent lights passing through adjacent pixel areas PA from being mixed with each other.

Hereinafter, structural relations between the color filters CF-R, CF-G, and CF-B, the black matrix BM, the inorganic layer 110, and the organic layer 120 will be further described in detail.

The color filters CF-R, CF-G, and CF-B are disposed in the pixel areas PA, respectively. At least an outer portion (e.g., an end portion) of each of the color filters is positioned at the non-pixel area NPA. The inorganic layer 110 is disposed on a surface of the color filters CF-R, CF-G, and CF-B to cover the surface of the color filters CF-R, CF-G, and CF-B.

The black matrix BM is disposed on the surface of the inorganic layer 110. The inorganic layer 110 is disposed between the black matrix BM and the color filters CF-R, CF-G, and CF-B. The black matrix BM is disposed in the non-pixel area NPA to overlap the outer portions of the color filters. Adjacent outer portions of two consecutive color filters are simultaneously covered by the black matrix BM.

The organic layer 120 covers the inorganic layer 110 and the black matrix BM, wherein the black matrix BM is disposed between the organic layer 120 and the inorganic layer 110.

Figure 3:
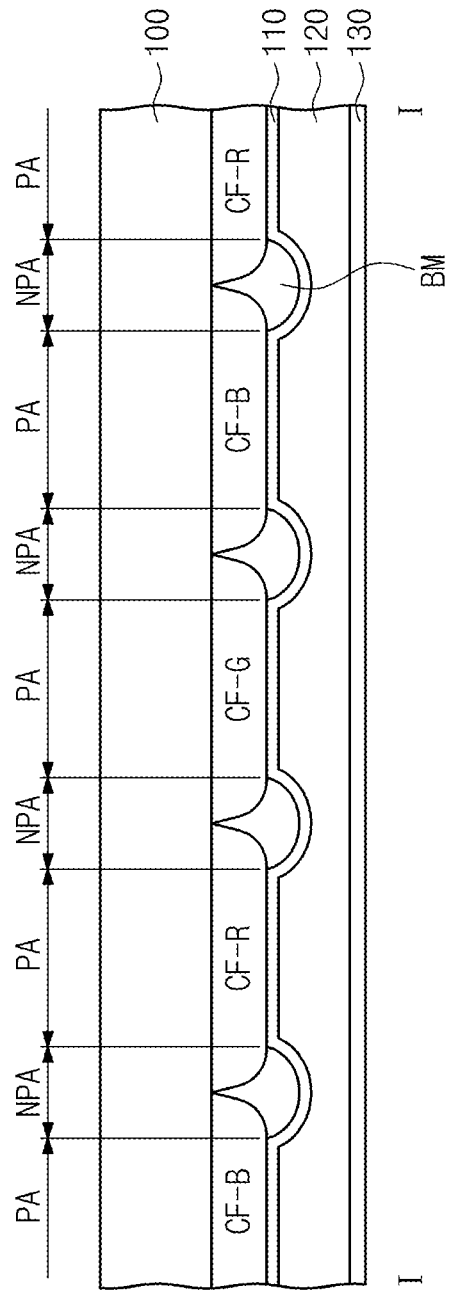
FIG. 3 is a cross-sectional view illustrating a structure of a first display substrate according to an embodiment of the present invention.
Figure 4:
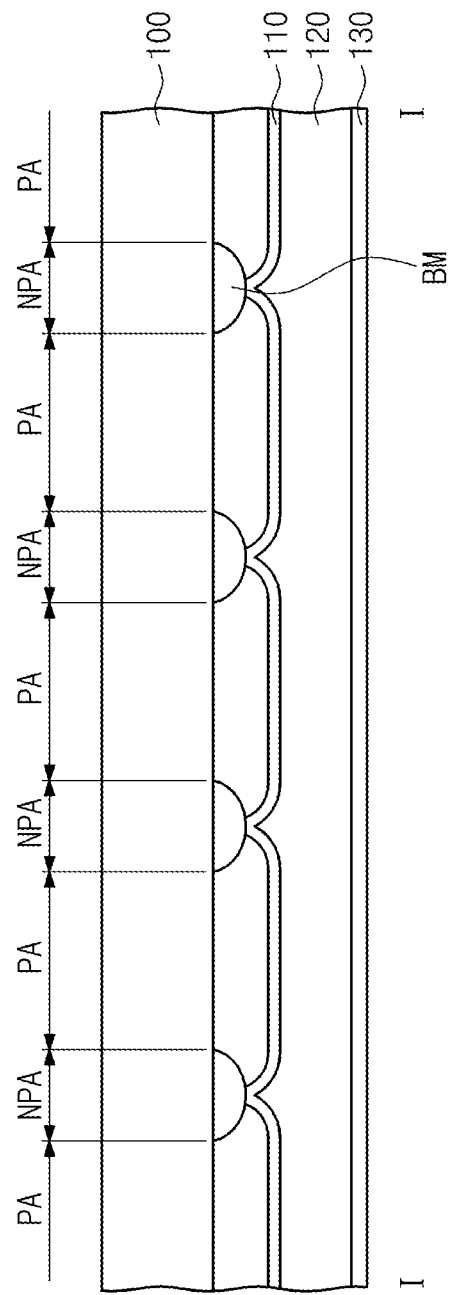
FIG. 4 is a cross-sectional view illustrating a structure of a first display substrate according to an embodiment of the present invention.

FIG. 3 is a cross-sectional view illustrating a structure of a first display substrate according to an embodiment of the present invention. FIG. 4 is a cross-sectional view illustrating a structure of a first display substrate according to an embodiment of the present invention. In FIGS. 3 and 4, the same reference numerals may denote the same elements or same materials in FIGS. 1 and 2, and detailed descriptions of the same elements or same materials may be omitted.

Referring to FIG. 3, the color filters CF-R, CF-G, and CF-B are disposed on a surface of the first substrate 100, and the black matrix BM is disposed on a surface of the color filters CF-R, CF-G, and CF-B. The black matrix BM contacts the color filters CF-R, CF-G, and CF-B. In one or more embodiments, the inorganic layer 110 covers the color filters CF-R, CF-G, and CF-B and the black matrix BM. At least a portion of the black matrix BM is disposed between two adjacent color filters. The black matrix BM is disposed between the inorganic layer 110 and the color filters.

Referring to FIG. 4, the color filters CF-R, CF-G, and CF-B and the black matrix BM are disposed on the surface of the first substrate 100 and contact the first substrate 100. The black matrix BM is disposed between color filters and is disposed between the first substrate 100 and the color filters CF-R, CF-G, and CF-B. A portion of the black matrix BM is exposed through spaces between the color filters CF-R, CF-G, and CF-B.

The inorganic layer 110 covers the color filters CF-R, CF-G, and CF-B and the black matrix BM. The inorganic layer 110 may contact and cover the exposed portion of the black matrix BM. Outer portions (or end portions) of the color filters CF-R, CF-G, and CF-B are disposed in the non-pixel area (NPA) and are disposed between the inorganic layer 110 and the black matrix BM.

Figure 5:
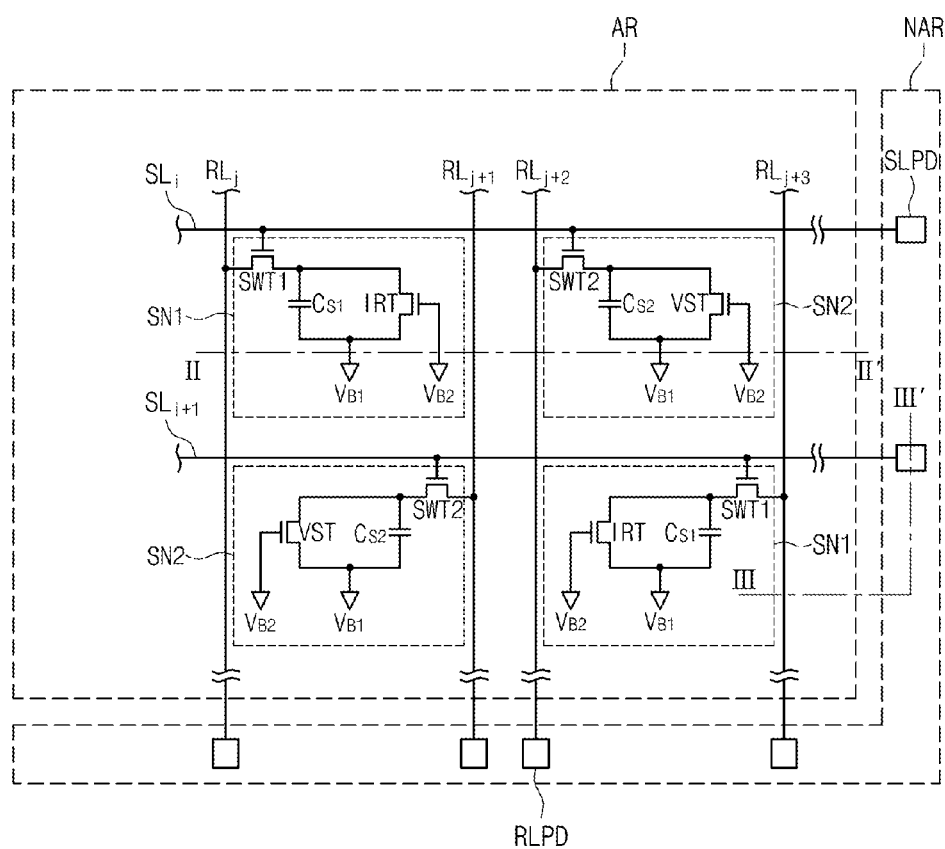
FIG. 5 is an equivalent circuit diagram illustrating a first display substrate according to an embodiment of the present invention.
Figure 6A:
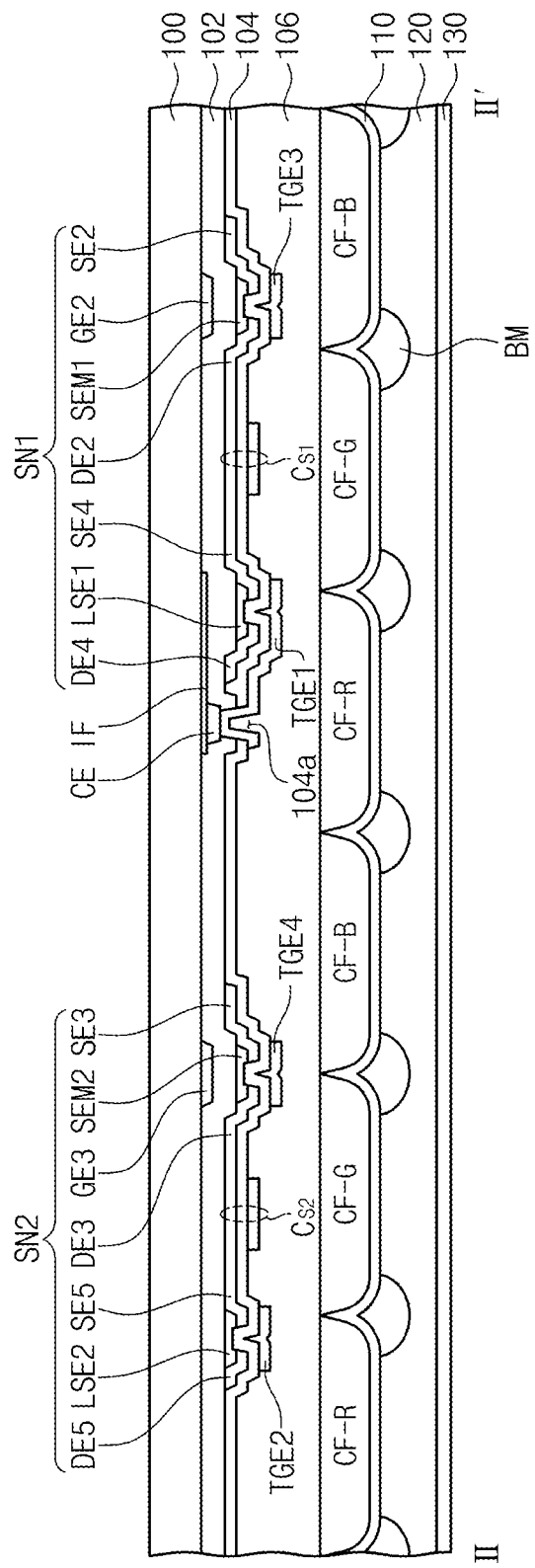
FIGS. 6A and 6B are cross-sectional views illustrating a structure the first display substrate illustrated in FIG. 5.
Figure 6B:
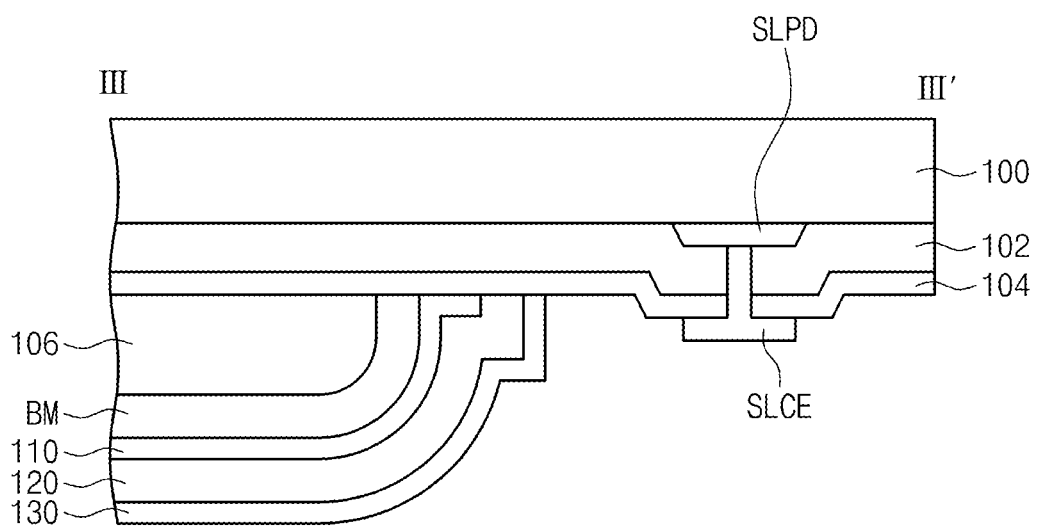

FIG. 5 is an equivalent circuit diagram illustrating a first display substrate according to an embodiment of the present invention. FIGS. 6A and 6B are cross-sectional views illustrating a structure of the first display substrate illustrated in FIG. 5. In FIGS. 5, 6A, and 6B, the same reference numerals may denote the same elements or same materials in FIGS. 1 to 4, and thus detailed descriptions of the same elements or same materials may be omitted.

Referring to FIGS. 5, 6A, and 6B, a display panel includes a plurality of scan lines disposed on the first substrate 100 and a plurality of read out lines disposed on the first substrate 100 and crossing the scan lines. For the convenience of explanation, two scan lines SLi and SLi+1 of the scan lines and four read out lines RLj, RLj+1, RLj+2, and RLj+3 of the read out lines have been illustrated in FIG. 5.

Scan pads SLPD respectively connected to ends of the scan lines SLi and SLi+1 and read out pads RLPD respectively connected to ends of the read out lines RLj, RLj+1, RLj+2, and RLj+3 are arranged in the non-active area NAR. The scan pads SLPD are electrically connected to a scan driver (not illustrated) mounted in the non-active area NAR, and the read out pads RLPD are electrically connected to a read out circuit (not illustrated) mounted in the non-active area NAR.

In addition, the display panel further includes light sensors SN1 and SN2 disposed on the first substrate 100.

The light sensors SN1 and SN2 include a first sensor SN1 sensing a light of a first wavelength within an infrared light wavelength band (hereinafter, referred to as a first light) and a second sensor SN2 sensing a light of a second wavelength within a visible light wavelength band (hereinafter, referred to as a second light).

The first sensor SN1 includes a first switching transistor SWT1, a first sensor transistor IRT, and a first capacitor CS1. The first switching transistor SWT1 includes a gate electrode connected to a corresponding scan line of the scan lines SLi and SLi+1, a source electrode connected to a corresponding read out line of the read out lines RLj, RLj+1, RLj+2, and RLj+3, and a drain electrode connected to the first capacitor CS1 and the first transistor IRT.

The first capacitor CS1 includes a first electrode connected to the drain electrode of the first switching transistor SWT1 and a second electrode applied with a first bias voltage VB1.

The first sensor transistor IRT includes a gate electrode applied with a second bias voltage VB2, a source electrode connected to the drain electrode of the first switching transistor SWT1, and a drain electrode applied with the first bias voltage VB1. The second bias voltage VB2 has a voltage value smaller than the voltage value of the first bias voltage VB1.

The first sensor transistor IRT generates a photo-current corresponding to a light amount of the first light (from a light source). That is, as the light amount of the first light incident to the first sensor transistor IRT increases, a voltage charged in the first capacitor CS1 is increased. Accordingly, the first sensor SN1 may sense the first light.

The second sensor SN2 includes a second switching transistor SWT2, a second sensor transistor VST, and a second capacitor CS2. The second switching transistor SWT2 includes a gate electrode connected to a corresponding scan line of the scan lines SLi and SLi+1, a source electrode connected to a corresponding read out line of the read lines RLj, RLj+1, RLj+2, and RLj+3, and a drain electrode connected to the second capacitor CS2 and the second sensor transistor VST.

The second capacitor CS2 includes a first electrode connected to the drain electrode of the second switching transistor SWT2 and a second electrode applied with the first bias voltage VB1.

The second sensor transistor VST includes a gate electrode applied with the second bias voltage VB2, a source electrode connected to the drain electrode of the second switching transistor SWT2, and a drain electrode applied with the first bias voltage VB1.

The second sensor transistor VST generates a photo-current corresponding to a light amount of the second light (from a light source). A voltage charged in the second capacitor CS2 increases by the photo-current generated by the second sensor transistor VST. Thus, the second sensor SN2 may sense the second light.

The scan lines SLi and SLi+1 are connected to the scan driver to sequentially receive a scan signal from the scan driver. The read out lines RLj, RLj+1, RLj+2, and RLj+3 are connected to the read out circuit to provide the voltage charged in the first and second sensors SN1 and SN2 to the read out circuit.

When each of the first and second switching transistors SWT1 and SWT2 is turned on in response to the scan signal provided through the corresponding scan line, each of the first and second sensors SN1 and SN2 provides the voltage charged in a corresponding one of the first and second capacitors CS1 and CS2 to the corresponding read out line through the corresponding one of the turned-on first and second switching transistors SWT1 and SWT2.

A two-dimensional coordinate value, which is related to a touch position at which a touch occurring on the display panel or related to information about an object to be scanned, is generated based on a time point at which the scan signal is generated and the voltage provided from the read out circuit.

As illustrated in FIG. 5 and FIG. 6A, the first and second light sensors SN1 and SN2 are disposed in the active area AR. The gate electrodes GE2 and GE3 of the first and second switching transistors SWT1 and SWT2 are disposed on the surface of the first substrate 100 and contact the first substrate 100.

A first gate insulating layer 102 is disposed on the first substrate 100 to cover the gate electrodes GE2 and GE3. A semiconductor layer SEM1 of the first switching transistor SWT1 and a semiconductor layer SEM2 of the second switching transistor SWT2 are disposed on the first insulating layer 102 and contact the first insulating layer 102.

In addition, a first light sensing layer LSE1 of the first sensor transistor IRT and a second light sensing layer LSE2 of the second sensor transistor VST are disposed on the first gate insulating layer 102 and contact the first insulating layer 102. The first light sensing layer LSE1 may include silicon germanium (SiGe) that reacts with the light of a wavelength within the infrared light wavelength band, and the second light sensing layer LSE2 may include amorphous silicon (a-Si) that reacts with the light of a wavelength within the visible light wavelength band.

The first substrate 100 (i.e., the base substrate) further carries an infrared ray filter IF configured to block the second light and transmit the first light. The infrared ray filter IF is disposed between the first substrate 100 and the first gate insulating layer 102 to correspond to and to overlap the first light sensing layer LSE1. In one or more embodiments, the infrared ray filter IF may include silicon germanium (SiGe).

Source and drain electrodes SE2 and DE2 are spaced apart from each other by a predetermined distance and disposed on the semiconductor layer SEM1 of the first switching transistor SWT1, and source and drain electrodes SE3 and DE3 are spaced apart from each other by a predetermined distance and disposed on the semiconductor layer SEM2 of the second switching transistor SWT2.

Source and drain electrodes SE4 and DE4 are spaced apart from each other by a predetermined distance and disposed on the first light sensing layer LSE1 of the first sensor transistor IRT, and source and drain electrodes SE5 and DE5 are spaced apart from each other by a predetermined distance and disposed on the second light sensing layer LSE2 of the second sensor transistor VST.

The source electrode SE4 of the first sensor transistor IRT is electrically connected to the drain electrode DE2 of the first switching transistor SWT1 and serves as the first electrode of the first capacitor CS1.

The source electrode SE5 of the second sensor transistor VST is electrically connected to the drain electrode DE3 of the second switching transistor SWT2 and serves as the first electrode of the second capacitor CS2.

The source and drain electrodes SE2 and DE2 of the first switching transistor SWT1, the source and drain electrodes SE3 and DE3 of the second switching transistor SWT2, the source and drain electrodes SE4 and DE4 of the first sensor transistor IRT, and the source and drain electrodes SE5 and DE5 of the second sensor transistor VST are covered by a first protective layer 104 and are disposed between the first protective layer 104 and the first insulating layer 102.

A gate electrode TGE1 (hereinafter, referred to as first top gate) of the first sensor transistor IRT and a gate electrode TGE2 (hereinafter, referred to as second top gate) of the second sensor transistor VST are disposed on the first protective layer 104.

In addition, the second electrode of the first capacitor CS1 and the second electrode of the second capacitor CS2 are disposed on the first protective layer 104.

In one or more embodiments, the first switching transistor SWT1 may further include a dummy gate electrode TGE3 disposed on the first protective layer 104 (and electrically connected to the gate electrode GE2). In addition, the second switching transistor SWT2 may further include a dummy gate electrode TGE4 disposed on the first protective layer 104 (and electrically connected to the gate electrode GE3).

In addition, as illustrated in FIG. 6A, the first top gate TGE1 of the first sensor transistor IRT may be electrically connected to the infrared ray filter IF. In detail, a connection electrode CE is disposed on the infrared ray filter IF, which is formed by the same process for forming the gate electrode GE2 of the first switching transistor SWT1. The first gate insulating layer 102 and the first protective layer 104 are provided with a contact hole 104a formed therethrough to expose the connection electrode CE, and the first top gate TGE1 is electrically connected to the connection electrode CE through the contact hole 104a.

The first and second top gates TGE1 and TGE2 of the first and second sensor transistors IRT and VST and the dummy gate electrodes TGE3 and TGE4 of the first and second switching transistors SWT1 and SWT2 may be covered by an insulating layer 106.

The color filters CF-R, CF-G, and CF-B, the black matrix BM, the inorganic layer 110, the organic layer 120, and the conductive layer 130 are disposed on the insulating layer 106.

In FIG. 6A, the layered structure on the insulating layer 106 is the same as that on the first substrate 100 illustrated in FIG. 2. Nevertheless, the display panel according to the present embodiment should not be limited to the layered structure illustrated in FIG. 6A. That is, the layered structure on the insulating layer 106 may be configured according to one or more embodiments illustrated in FIGS. 3 and 4.

As illustrated in FIG. 5 and FIG. 6B, the scan pad SLPD is disposed in the non-active area NAR. The scan pad SLPD is electrically connected to a scan electrode SLCE. The scan electrode SLCE is connected to the scan pad SLPD through a contact hole formed through the first gate insulating layer 102 and the first protective layer 104. The scan electrode SLCE may be electrically connected to the scan driver.

In the non-active area NAR, a portion of the inorganic layer 110 is disposed on the first protective layer 104 and contacts the first protective layer 104. In addition, the organic layer 120 and the conductive layer 130 are disposed on the inorganic layer 110 and are disposed on the first protective layer 104. If the inorganic layer 110 has a thickness thicker than a critical thickness, the inorganic layer 110 may push out the organic layer 120 and the conductive layer 130 toward the scan electrode SLCE such that the conductive layer 130 may contact the scan electrode SLCE; as a result, the display panel may malfunction. Analogous malfunctioning may also occur on a read out electrode (not illustrated) connected to the read out pad RLPD. Thus, in one or more embodiments, the thickness of the inorganic layer 110 is preferred to be about 300 angstroms or less so as to prevent the above-mentioned malfunctioning.

Figure 7:
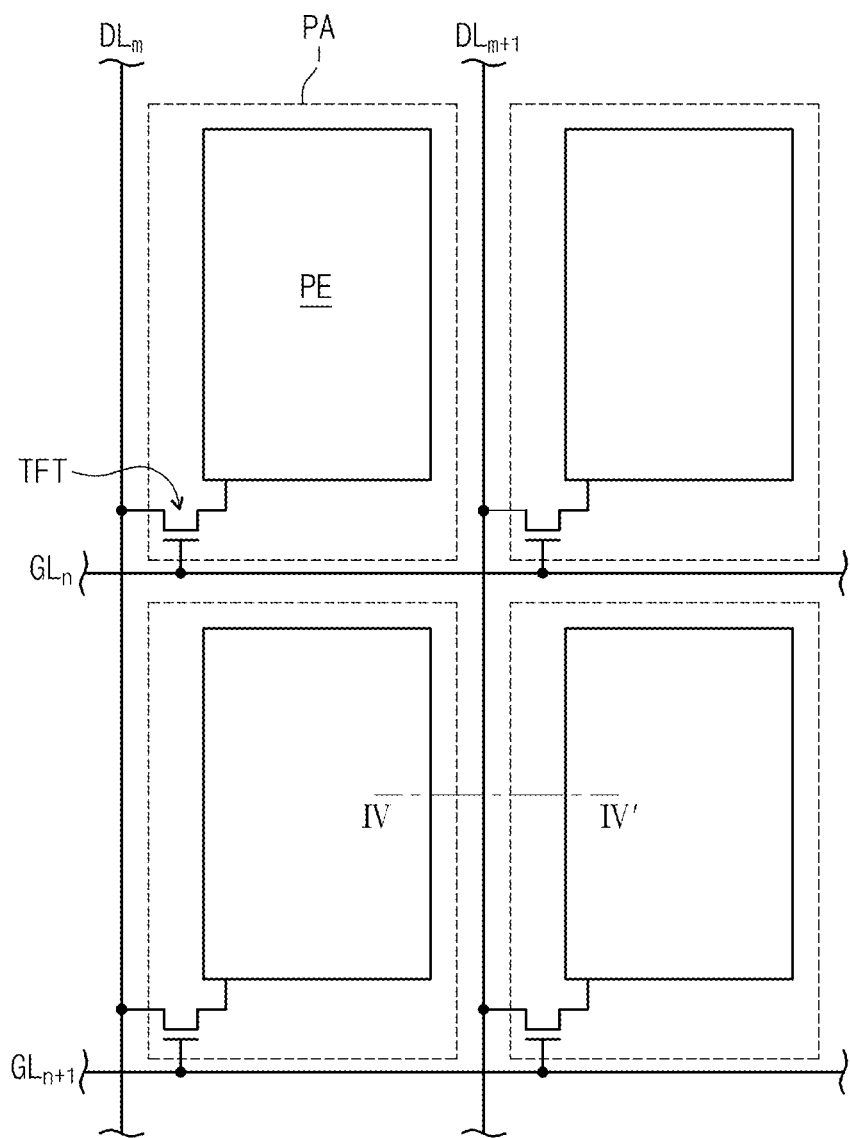
FIG. 7 is an equivalent circuit diagram illustrating a second display substrate according to an embodiment of the present invention.
Figure 8:
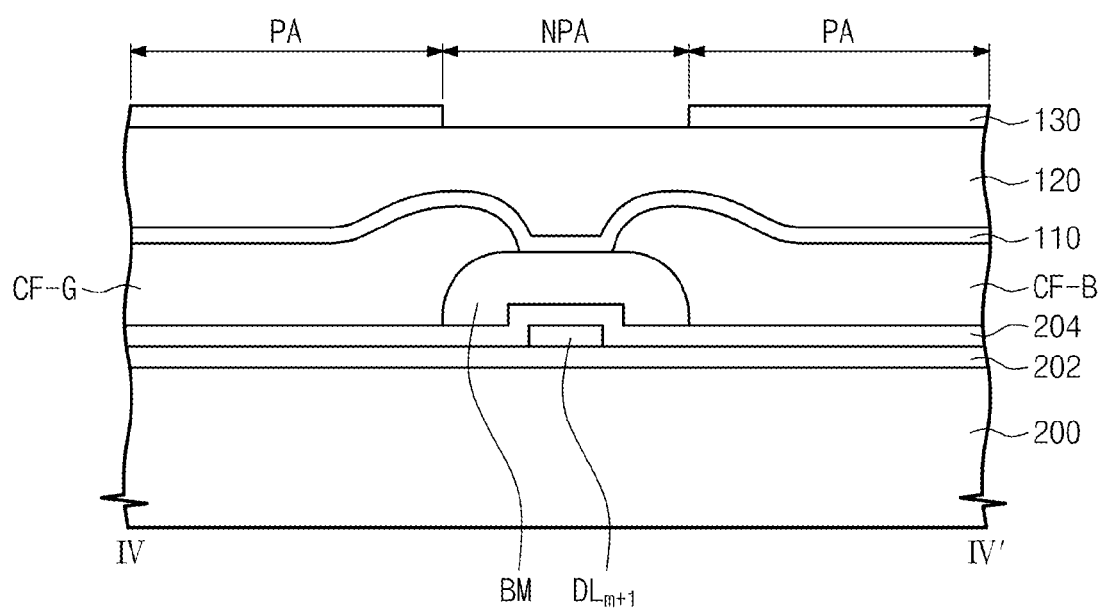
FIG. 8 is a cross-sectional view illustrating a structure of the second display substrate illustrated in FIG. 7.

FIG. 7 is an equivalent circuit diagram illustrating a second display substrate according to an embodiment of the present invention. FIG. 8 is a cross-sectional view illustrating a structure of the second display substrate illustrated in FIG. 7. In FIGS. 7 and 8, the same reference numerals may denote the same elements or materials in FIGS. 1 to 4, and thus detailed descriptions of the same elements or same materials may be omitted. In addition, for the convenience of explanation, two gate lines GLn and GLn+1 of the gate lines GL and two data lines DLm and DLm+1 of the data lines DL have been illustrated in FIG. 7.

Pixel electrodes PE are disposed in the pixel areas PA, respectively. Each pixel electrode PE is electrically connected to a switching device TFT. The switching device TFT may be a thin film transistor.

The thin film transistor TFT includes a gate electrode, a drain electrode, a source electrode, and an active layer.

The gate electrode is branched from a corresponding gate line of the gate lines GLn and GLn+1. The gate lines GLn and GLn+1 and a second gate insulating layer 202 are disposed on the second substrate 200, and the second gate insulating layer 202 covers the gate electrode.

The active layer is formed of hydrogenated amorphous silicon or polycrystalline silicon and disposed on the second gate insulating layer 202. The source electrode and the drain electrode are disposed on the active layer and are spaced apart from each other, thereby exposing the active layer. In addition, the data lines DLm and DLm+1 are disposed on the second gate insulating layer 202. The source electrode is branched from one of the data lines DLm and DLm+1.

A second protective layer 204 is disposed on the second gate insulating layer 202 to cover the source electrode, the drain electrode, and the exposed active layer.

In one or more embodiments, the color filters CF-G and CF-B may be disposed on the second substrate 200.

In one or more embodiments, the color filters CF-G and CF-B may be disposed on a surface of the second protective layer 204 and may contact the second protective layer 204.

The color filters CF-G and CF-B are disposed in the pixel areas PA of the second substrate 200.

In addition, an inorganic layer 110 is disposed on the color filters CF-G and CF-B, and an organic layer 120 is disposed on the inorganic layer 110.

A conductive layer 130 is disposed on the organic layer 120. In one or more embodiments, the conductive layer 130 may include the pixel electrodes PE disposed in the pixel areas PA. Each pixel electrode PE includes a plurality of micro-slits (not illustrated) formed therethrough.

In one or more embodiments, the conductive layer 130 is not limited to a pixel electrode PE. In one or more embodiments, the display panel is a horizontal electric field type liquid crystal display panel in which the common electrode is disposed on the second substrate 200 and not on the first substrate 100, and the conductive layer 130 may be the common electrode.

The black matrix BM is disposed in the non-pixel area NPA. The gate lines GLn and GLn+1 and the data lines DLm and DLm+1 may be disposed in the non-pixel area NPA of the second substrate 200. The black matrix BM is disposed on a different layer from a layer on which the gate lines GLn and GLn+1 and the data lines DLm and DLm+1 are disposed. The black matrix BM overlaps the gate lines GLn and GLn+1 and/or the data lines DLm and DLm+1.

The color filters CF-G and CF-B and the black matrix BM are disposed on a surface of the second protective layer 204. An exposed portion of the black matrix BM is exposed through and overlaps a space between the color filters CF-G and CF-B. The exposed portion of the black matrix BM overlaps and contacts a portion of the inorganic layer 110 that is disposed between the color filters CF-G and CF-B.

The inorganic layer 110 covers the color filters CF-G and CF-B and the black matrix BM. The inorganic layer 110 covers the exposed portion of the black matrix BM.

In one or more embodiments, as illustrated in FIG. 8, the layered structure on the second protective layer 204 may be analogous to the structure formed on the first substrate 100 illustrated in FIG. 4. In one or more embodiments, the layered structure on the second protective layer 204 may be analogous to one or more structures illustrated in at least one of FIGS. 2 and 3.

Figure 9:
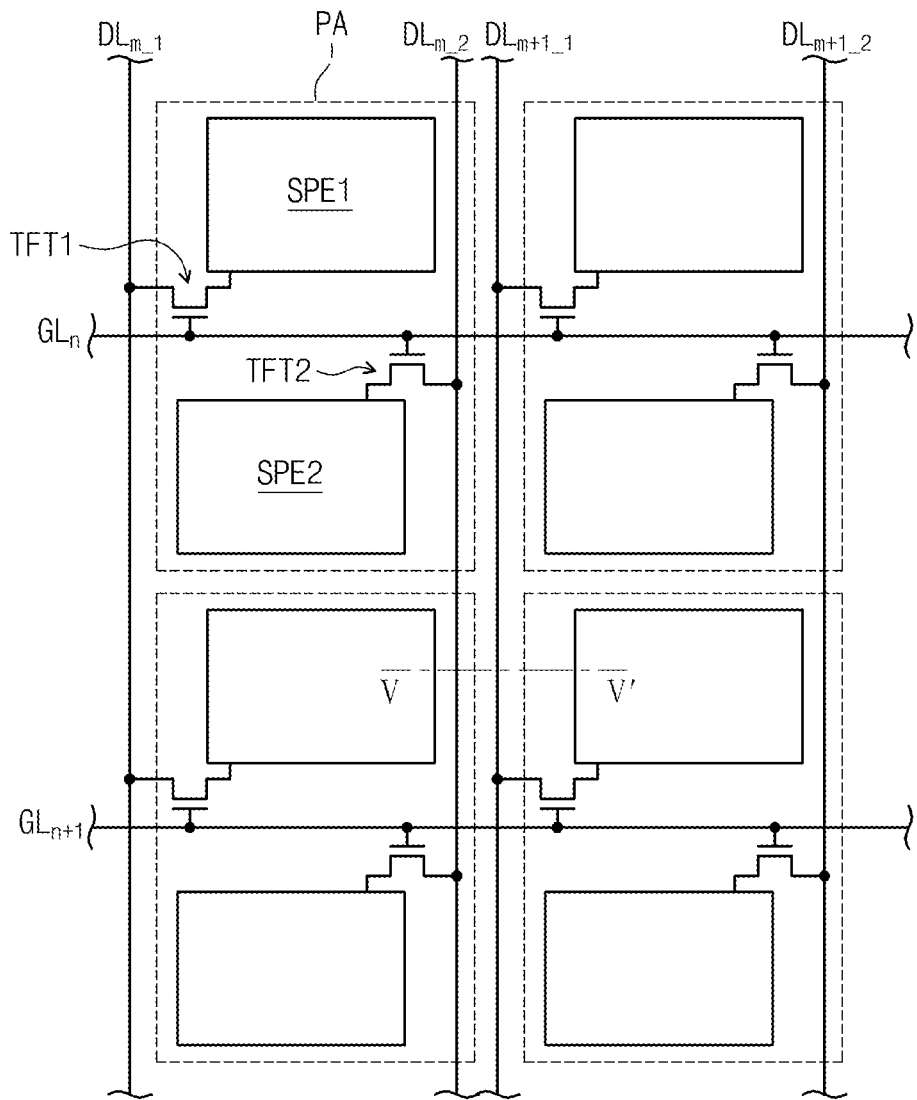
FIG. 9 is an equivalent circuit diagram illustrating a second display substrate according to an embodiment of the present invention.
Figure 10:
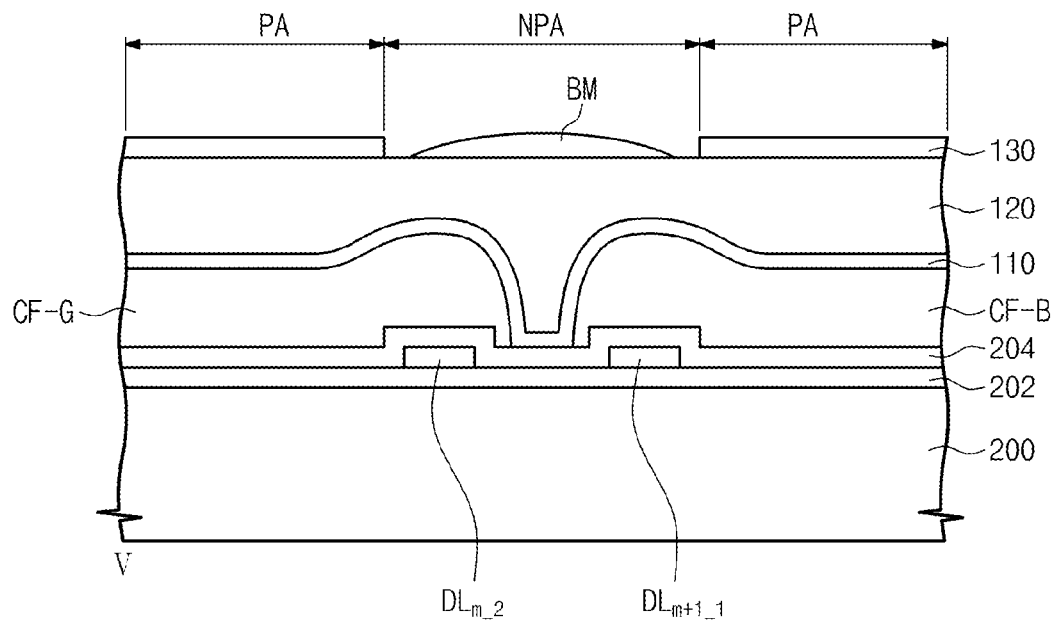
FIG. 10 is a cross-sectional view illustrating a structure of a second display substrate according to an embodiment of the present invention.
Figure 11:
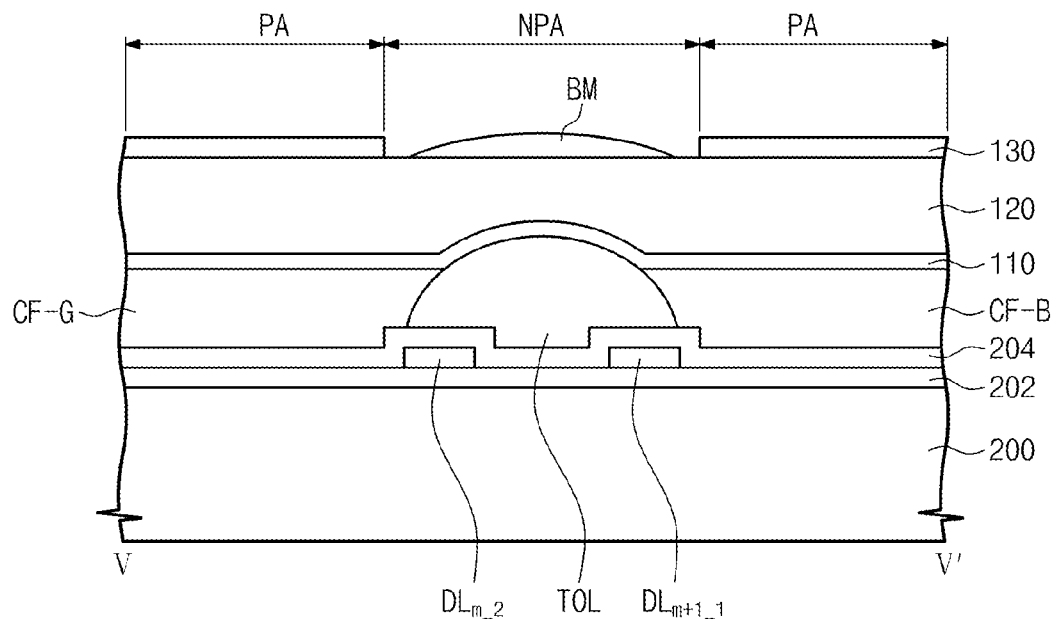
FIG. 11 is a cross-sectional view illustrating a structure of a second display substrate according to an embodiment of the present invention.

FIG. 9 is an equivalent circuit diagram illustrating a second display substrate according to an embodiment of the present invention. FIG. 10 is a cross-sectional view illustrating a structure of a second display substrate according to an embodiment of the present invention. FIG. 11 is a cross-sectional view illustrating a structure of a second display substrate according to an embodiment of the present invention. In FIGS. 9 to 11, the same reference numerals may denote the same elements or same materials in FIGS. 7 and 8, and thus detailed descriptions of the same elements or same materials may be omitted.

Referring to FIGS. 9 and 10, each pixel electrode PE includes a first sub-pixel electrode SPE1 and a second sub-pixel electrode SPE2, which are spaced apart from each other.

The display panel includes first data lines DLm_1 and DLm+1_1 and second data lines DLm_2 and DLm+1_2 substantially parallel to the first data lines DLm_1 and CLm+1_1.

The display panel further includes a first switching device TFT1 electrically connected to a corresponding one of the first data lines DLm_1 and DLm+1 and the first sub-pixel electrode SPE1 and a second switching device TFT2 electrically connected to a corresponding one of the second data lines DLm_2 and DLm+1_2 and the second sub-pixel electrode SPE2.

Color filters CF-G and CF-B are disposed in the pixel area PA, and a black matrix BM is disposed in the non-pixel area NPA. The gate lines GLn and GLn+1, the first data lines DLm_1 and DLm+1_1, and the second data lines DLm_2 and CLm+1_2 are disposed in the non-pixel area NPA of the second substrate 200.

The color filters CF-G and CF-B are disposed on a surface of the second protective layer 204. An exposed portion of the surface of the second protective layer 204 is exposed through and overlaps a space between the color filters CF-G and CF-B. An inorganic layer 110 covers the color filters CF-G and CF-B and the exposed portion of the second protective layer 204. A portion of the inorganic layer 110 is disposed between the color filters CF-G and CF-B and contacts the exposed portion of the second protective layer 204. An organic layer 120 is disposed on a surface of the inorganic layer 110.

The first sub-pixel electrode SPE1, the second sub-pixel electrode SPE2, and the black matrix BM are disposed on the surface of the organic layer 120. The first sub-pixel electrode SPE1 and the second sub-pixel electrode SPE2 (each being a portion of a conductive layer 130) are disposed in the pixel area PA. The black matrix BM is disposed in the non-pixel area NPA and overlaps the gate lines GLn and GLn+1, the first data lines DLm_1 and DLm+1_1, and the second data lines DLm_2 and DLm+1_2. The black matrix BM is disposed between portions of the conductive layer 130.

In one or more embodiments, the layered structure on the second protective layer 204 is not limited to the layered structure illustrated in FIG. 10. In one or more embodiments, the layered structure on the second protective layer 204 may be analogous to one or more structures illustrated in at least one of FIGS. 2 and 4.

The structure illustrated in FIG. 11 is analogous to the structure illustrated in FIG. 10. The structure illustrated in FIG. 11 further includes a transparent organic layer TIL disposed between the color filters CF-G and CF-B on the surface of the second protective layer 204. The transparent organic layer TIL is disposed in the non-pixel area NPA. The transparent organic layer TIL overlaps the black matrix BM. The transparent organic layer TIL sets boundaries of the color filters CF-G and CF-B and prevents the color filters CF-G and CF-B from being substantially disposed in the non-pixel area NPA. The inorganic layer 110 covers the color filters CF-G and CF-B and the transparent organic layer TIL.

FIGS. 12A to 12E are views illustrating a method of manufacturing a display substrate according to an embodiment of the present invention.

Referring to FIG. 12A, a base substrate BS is prepared to include a plurality of pixel areas PA and a non-pixel area NPA disposed adjacent to the pixel areas PA. The base substrate BS may represent the previously-discussed first substrate 100 or the previously-discussed second substrate 200. In one or more embodiments, the base substrate BS is used as the first substrate 100 illustrated in FIGS. 2 to 6, and the non-pixel area NPA may include the black matrix BM formed therein. In one or more embodiments, the base substrate BS is used for the second substrate 200 illustrated in FIGS. 7 to 10, and the non-pixel area NPA includes the gate lines GLn and GLn+1 and the data lines DLm and DLm+1 and may include the black matrix BM.

The color filters CF-R, CF-G, and CF-B are respectively formed in the pixel areas PA of the base substrate BS. In one or more embodiments, the base substrate BS is used as the first substrate 100 illustrated in FIGS. 5 and 6, and the color filters CF-R, CF-G, and CF-B are disposed on the insulating layer 106.

In one or more embodiments, the base substrate BS is used for the first substrate 100 illustrated in FIGS. 8 to 11, and the color filter layer CF-R, CF-G, and CF-B are disposed on the second protective layer 204. The color filters CF-R, CF-G, and CF-B may be formed by an inkjet printing method.

Subsequently, as illustrated in FIGS. 12B and 12C, the inorganic layer 110 is formed on the color filters CF-R, CF-G, and CF-B.

Referring to FIG. 12B, the black matrix BM is formed on the color filters CF-R, CF-G, and CF-B to be disposed in the non-pixel area NPA. As illustrated in FIG. 12C, the inorganic layer 110 is formed on the color filter layer CF-R, CF-G, and CF-B and the black matrix BM.

Referring to FIG. 12D, the organic layer 120 is formed on the inorganic layer 110.

Subsequently, as illustrated in FIG. 12E, the conductive layer 130 is formed on the organic layer 120. As a result, a first display substrate that includes the first substrate 100 illustrated in FIG. 3 or a second display substrate that includes the second substrate 200 having the layered structure illustrated in FIG. 3 is manufactured.

The inorganic layer 110, the organic layer 120, and the conductive layer 130 may be formed by coating an inorganic material, an organic material, and a conductive material and curing the inorganic material, the organic material, and the conductive material. The inorganic layer 110 prevents the solvent included in the organic material from infiltrating into the color filters CF-R, CF-G, and CF-B when coating and curing the organic material on the inorganic layer 110.

Although not illustrated in figures, the method of manufacturing the display substrate according to the present embodiment may further include a process of patterning the conductive layer 130 using a photolithography process.

FIGS. 13A to 13E are views illustrating a method of manufacturing a display substrate according to an embodiment of the present invention. In FIGS. 13A to 13E, the same processes as those described with reference with FIGS. 12A to 12E may be omitted in order to avoid redundancy.

As illustrated in FIGS. 13B to 13D, the black matrix BM is formed on the surface of the inorganic layer 110. The black matrix BM is disposed in the non-pixel area NPA after forming the inorganic layer 110 and before forming the organic layer 120. Thus, a first display substrate that includes the first substrate 100 illustrated in FIG. 2 or a second display substrate that includes the second substrate 200 having the layered structure illustrated in FIG. 2 is manufactured.

FIGS. 14A to 14E are views illustrating a method of manufacturing a display substrate according to an embodiment of the present invention. In FIGS. 14A to 14E, the same processes as those described with reference with FIGS. 12A to 12E may be omitted in order to avoid redundancy.

As illustrated in FIGS. 14A to 14C, the inorganic layer 110 is formed on the base substrate BS on which the color filters CF-R, CF-G, and CF-B and the black matrix BM have been formed.

The black matrix BM is disposed in the non-pixel area NPA of the base substrate BS. Boundaries of the black matrix BM correspond to boundaries of the non-pixel area NPA. The color filters CF-R, CF-G, and CF-B are disposed in the pixel areas PA. The color filters CF-R, CF-G, and CF-B overlap the black matrix BM in the non-pixel area NPA. Exposed portions of the black matrix BM are exposed through spaces between the color filters CF-R, CF-G, and CF-B.

Figure 14E:
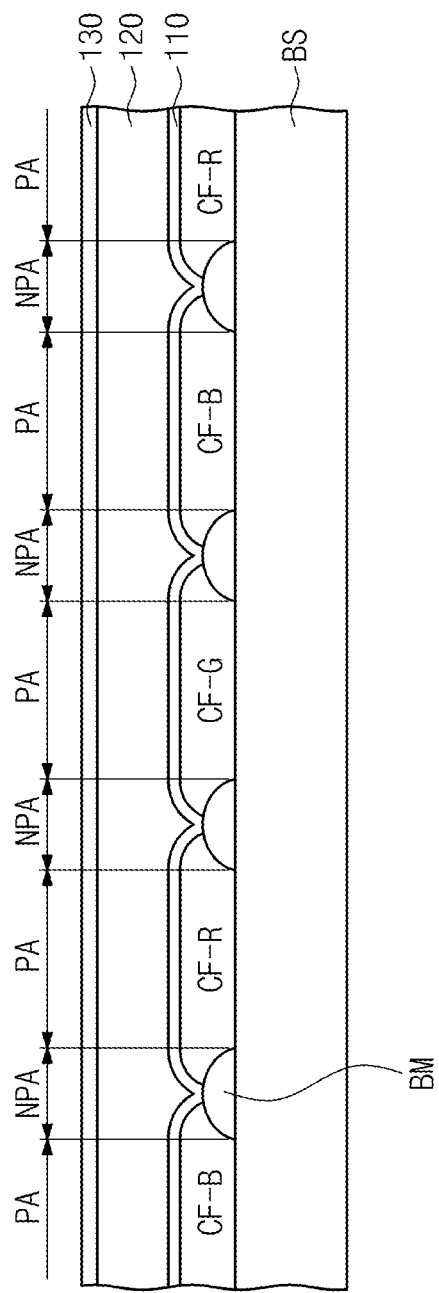

As illustrated in FIGS. 14A to 14C, after the black matrix BM is formed on the base substrate BS, the color filters CF-R, CF-G, and CF-B are formed, and the inorganic layer 110 is formed to cover the color filters CF-R, CF-G, and CF-B and the exposed portions of the black matrix BM. Subsequently, the organic layer 120 and the conductive layer 130 are formed as illustrated in FIGS. 14D and 14E.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:
1. A display panel comprising:
a first substrate including a plurality of pixel areas and a non-pixel area disposed adjacent to the pixel areas;
a second substrate facing the first substrate;
a plurality of gate lines disposed on the second substrate;
a plurality of data lines disposed on the second substrate;
a plurality of switching devices disposed on the second substrate, each of the plurality of switching devices being connected to a corresponding gate line of the plurality of gate lines and a corresponding data line of the plurality of data lines;
a plurality of pixel electrodes disposed on the second substrate and electrically connected to a corresponding switching device of the plurality of switching devices;
a plurality of scan lines disposed on the first substrate;
a plurality of read out lines disposed on the first substrate;
a plurality of light sensors disposed on the first substrate and sensing at least one of a light of an infrared light wavelength band or a light of a visible light wavelength band, each of the plurality of light sensors being connected to a corresponding scan line of the scan lines and a corresponding read out line of the plurality of read out lines;
an insulating layer disposed on the first substrate and covering the plurality of scan lines;
a color filter disposed on the insulating layer and having a first portion overlapping a pixel area of the first substrate and a second portion extending into an adjacent non-pixel area of the first substrate;
a black matrix disposed on the color filter;
a plurality of scan electrodes disposed on the insulating layer and connected to the plurality of scan lines;
an inorganic layer disposed on the insulating layer and covering the color filter layer;
an organic layer disposed on the insulating layer and covering the inorganic layer; and
a conductive layer disposed on the insulating layer and covering the organic layer and spaced from the plurality of scan electrodes,
wherein at least a portion of the black matrix is disposed in one of the following configurations:
the portion of the black matrix is disposed directly on the second portion of the color filter and between the second portion of the color filter and the inorganic layer, or the portion of the black matrix is disposed directly on the second portion of the color filter and between the second portion of the color filter and the first substrate.

2. The display panel of claim 1, wherein the black matrix is disposed on the inorganic layer, and the organic layer covers the inorganic layer and the black matrix.

3. The display panel of claim 1, wherein the black matrix contacts the color filter layer, and the inorganic layer covers the color filter and the black matrix.

4. The display panel of claim 1, wherein the black matrix contacts the first substrate, and the inorganic layer covers the color filter and the black matrix.

5. The display panel of claim 1, wherein the color filter layer is disposed on the insulating layer.

6. The display panel of claim 1, wherein the light sensors comprise at least one of a first sensor configured to sense the light of an infrared light wavelength and a second sensor configured to sense the light of a visible light wavelength.

7. The display panel of claim 1, wherein each of the pixel electrodes comprises a first sub-pixel and a second sub-pixel spaced apart from the first sub-pixel, the plurality of data lines comprises a first data line and a second data line substantially parallel to the first data line, and the plurality of switching devices comprises a first switching device electrically connected to the first data line and the first sub-pixel electrode and a second switching device electrically connected to the second data line and the second sub-pixel electrode.

8. The display panel of claim 1, further comprising a liquid crystal layer interposed between the first substrate and the second substrate.

* * * * *